(12) United States Patent
Chodelka et al.

(10) Patent No.: US 7,887,631 B2
(45) Date of Patent: Feb. 15, 2011

(54) SYSTEM AND HIGH PRESSURE, HIGH TEMPERATURE APPARATUS FOR PRODUCING SYNTHETIC DIAMONDS

(75) Inventors: Robert Chodelka, Sarasota, FL (US); Hexiang Zhu, Sarasota, FL (US); Alexander Novikov, Sarasota, FL (US)

(73) Assignee: The Gemesis Corporation, Sarasota, FL (US)

( * ) Notice: Subject to any disclaimer, the term of this patent is extended or adjusted under 35 U.S.C. 154(b) by 1224 days.

(21) Appl. No.: 11/165,542

(22) Filed: Jun. 24, 2005

(65) Prior Publication Data

US 2006/0288927 A1    Dec. 28, 2006

(51) Int. Cl.
C30B 29/06    (2006.01)

(52) U.S. Cl. .................. 117/3; 117/5; 117/929; 423/446

(58) Field of Classification Search ........ 117/3, 117/5, 929; 423/446
See application file for complete search history.

(56) References Cited

U.S. PATENT DOCUMENTS

| | | | |
|---|---|---|---|
| 3,914,078 A | 10/1975 | Kendall | |
| 4,290,741 A | 9/1981 | Kolchin et al. | |
| 4,301,134 A | 11/1981 | Strong | |
| 4,518,334 A | 5/1985 | Ishizuka | |
| 5,244,368 A | 9/1993 | Frushour | |
| 5,980,852 A | 11/1999 | Burns et al. | |
| 6,030,595 A | 2/2000 | Sumiya et al. | |
| 2003/0140845 A1* | 7/2003 | D'Evelyn et al. | 117/8 |
| 2004/0004314 A1* | 1/2004 | Yoneda et al. | 266/249 |
| 2004/0134415 A1 | 7/2004 | D'Evelyn et al. | |

* cited by examiner

Primary Examiner—Robert M Kunemund
(74) Attorney, Agent, or Firm—The Nath Law Group; Jerald L. Meyer

(57) ABSTRACT

An apparatus for growing a synthetic diamond comprises a growth chamber, at least one manifold allowing access to the growth chamber, and a plurality of safety clamps positioned on opposite sides of the growth chamber; wherein the growth chamber and the plurality of safety clamps are comprised of a material having a tensile strength of about 120,000-200,000 psi, a yield strength of about 100,000-160,000 psi, an elongation of about 10-20%, an area reduction of about 40-50%, an impact strength of about 30-40 ft-lbs, and a hardness greater than 320 BHN.

21 Claims, 2 Drawing Sheets

SYSTEM AND HIGH PRESSURE, HIGH TEMPERATURE APPARATUS FOR PRODUCING SYNTHETIC DIAMONDS

BACKGROUND OF THE INVENTION

1. Field of the Invention

The present inventive subject matter relates to a system including a high pressure, high temperature apparatus. In particular, the present inventive subject matter relates to a system and a high pressure, high temperature apparatus suitable for producing synthetic diamonds.

2. Description of the Prior Art

Synthetic diamonds are manufactured by a process of applying extreme pressure (e.g., 65 kilobars) to a quantity of a carbon source disposed within a container, and heating the container under pressure to a sufficient temperature wherein the diamond is thermodynamically stable. A high pressure, high temperature apparatus is often used to apply the necessary pressure and heat to the carbon source to achieve conversion of the graphite to the more thermodynamically stable diamond.

The synthesis of diamond crystals by high pressure, high temperature processes has become well established commercially. Diamond growth in high pressure, high temperature processes occurs by the diffusion of carbon through a thin metallic film of any of a series of specific catalyst-solvent materials. Although such processes are very successfully employed for the commercial production of industrial diamond, the ultimate crystal size of such diamond growth is limited by the fact that the carbon flux across the catalyst film is established by the solubility difference between graphite and the diamond being formed. This solubility difference is generally susceptible to significant decrease over any extended period due to a decrease in pressure in the system and/or poisoning effects in the graphite being converted.

While most commercial processes for synthesizing diamonds produce small or relatively small particles, there are processes known for producing much larger diamonds. These processes generally involve producing the diamond in a reaction vessel in which a predetermined temperature gradient between the diamond seed material and the source of carbon is created. The diamond seed material is at a point at which the temperature of the reaction medium will be near the minimum value while the source of carbon is placed at a point where the temperature will be near its maximum. A layer of diamond nucleation suppressing material and/or an isolating material is interposed between the mass of metallic catalyst/solvent and the diamond seed material.

By very carefully adjusting pressure and temperature and utilizing relatively small temperature gradients with extended growth times, larger diamonds can be produced by using the high pressure, high temperature apparatus. Attempts to reliably produce very high quality diamond growth, however, have presented a number of mutually exclusive, yet simultaneously occurring problems. These problems include the strong tendency for spontaneous nucleation of diamond crystals near the diamond seed material (which occurs with an increase in the temperature gradient over the "safe" value). If the growth period is extended to produce diamond growth from the seed of greater than about 1/20 carat in size, the nucleated growth competes with the growth from the diamond seed with subsequently occurring collisions of multiple crystals that result in stress fractures within the grown crystals. Another problem is the partial or complete dissolution of the diamond seed material in the melted catalyst-solvent metal during that part of the process in which the catalyst-solvent medium becomes saturated with carbon from the nutrient source and then melts. Such dissolution produces uncoordinated diamond growth proceeding from spaced loci, which growths upon meeting, result in subsequent confused, flaw-filled growth of the diamond crystal.

In addition to overcoming the problems of spontaneous nucleation of diamond and diamond seed dissolution, it is highly desirable to be able to exercise reproducible control over the diamond growth process and, thereby, be able to produce novel diamond products, e.g. diamonds having unique color patterns and characteristics as well as affording the possibility of optimizing one or more physical properties in a given diamond.

Many apparatuses and systems have been developed for making synthetic diamonds with the aim of producing stones of unique color and characteristics. For example, Kendall, in U.S. Pat. No. 3,914,078, discloses generation of ultra-high pressures by a pair of opposed Bridgeman-type anvils. The generation of pressure is improved by surrounding the major portions of each anvil with a frustro-conical segmented jacket in position to transmit vertical forces thereon to the anvils in an axial direction and at the same time induce lateral compressive stresses therein for increasing the resistance thereof to brittle failure. Additional support is provided to the pressure-face ends of the anvils by a die ring laterally disposed therebetween in position to be circumferentially stressed by a segmented die ring which is, in turn, similarly compressed by a band of pressure-transmitting metal subjected to lateral extrusion by an annular piston enclosing the pressure system. The displacement of the piston is adjustably controlled in accordance with the size of the anvils and the axial forces thereon to provide optimum support to the die ring.

Strong, in U.S. Pat. No. 4,301,134, discloses diamond crystals of controlled impurity content and/or impurity distribution and reaction vessel configurations for the production thereof. Combinations of "dopant", "getter" and "compensator" materials are employed to produce gem stones of unusual color patterns, or zoned coloration, using specific reaction vessel configurations. The reaction vessel configurations include a pair of punches and an intermediate belt or die member. The die member defines a centrally-located aperture and, together with the punches, defines two annular volumes to which pressure may be applied.

Ishizuka, in U.S. Pat. No. 4,518,334, discloses a high temperature high pressure apparatus which comprises: an annular die having a straight cylindrical bore and a substantially conical face in adjacency outwards with each end thereof, a pair of tapered punches which are in opposed and axial alignment with the die so that a conical face of each punch is substantially in parallel with that of the die, a pair of inner gaskets, each of which is made of fired refractory and arranged in direct abutment on the conical face of the punch and the bore of the die, a pair of outer gaskets, which are made of material of intermediate hardness level and arranged in adjacency outside the inner gasket, and a pair of stopper rings of readily deformable but highly tough material and arranged in adjacency outwards to the outer gaskets. The high temperature high pressure apparatus is used in the production of synthetic diamonds or cubic boron nitride.

Frushour, in U.S. Pat. No. 5,244,368, discloses a high pressure/high temperature piston-cylinder-type apparatus having an electrically insulating diamond or cubic boron nitride coating disposed between one or both movable pistons and the surrounding core to electrically isolate the piston or pistons from the surrounding core. The electrically insulating coating is applied to the exterior surface of one or both of the pistons or, alternately, to the inner surface of the core. Electrically insulated, right circular cylindrical pistons are used at both ends of the apparatus resulting in the ability to uniformly compress reaction charges at high temperatures with a much higher length-to-diameter ratio. A ring of electrical insulating material is alternately mounted at the reaction charge end of each piston, with the remaining exterior surface of each piston coated with a thin, elastically insulating layer.

Burns et al., in U.S. Pat. No. 5,980,852, disclose a reaction vessel for use in producing large diamond crystals of good quality and yield including a reaction volume and a reaction mass located in the volume. The reaction mass comprises a plurality of seed particles located in or on a surface in the reaction volume and a carbon source separated from the seed particles by a mass of metallic catalyst/solvent for diamond synthesis. The mass comprises alternating layers of carbon-rich and carbon-lean metallic catalyst/solvent which lie parallel or substantially parallel to the surface. There is also a mass of alternating layers of carbon-rich and carbon-lean metallic catalyst/solvent within the volume.

Sumiya et al., in U.S. Pat. No. 6,030,595, disclose a high purity synthetic diamond with less impurities, crystals defects, strains, etc., in which the nitrogen content is at most 10 ppm, preferably at most 0.1 ppm and the boron content is at most 1 ppm, preferably at most 0.1 ppm or in which nitrogen atoms and boron atoms are contained in the crystal and the difference between the number of the nitrogen atoms and that of the boron atoms is at most $1 \times 10^{17}$ atoms/cm$^3$. The strain-free synthetic diamond is produced by a process for the production of a strain-free synthetic diamond by the temperature gradient method, which comprises using a carbon source having a boron content of at most 10 ppm and a solvent metal having a boron content of at most 1 ppm and adding a nitrogen getter to the solvent metal, thereby synthesizing the diamond.

However, the apparatuses currently used for producing synthetic diamonds and other ultra-hard materials by way of the application of high pressure and high temperature do not always provide the necessary reproducibility and quality of the gemstones due to the problems discussed above with respect to the dissolution of the seed material in the solvent catalyst and the presence of multiple nucleation sites. The loss of a production run for making a synthetic diamond results in lost product and lost profits since the time to produce a synthetic diamond is a number of days. Thus, it is important to be able to provide ideal production conditions in the apparatus in order to ensure growth of the synthetic diamond.

It is also important that the apparatus be able to withstand the pressures and temperatures associated with making the synthetic diamond. If the material from which the apparatus is made is too soft, the apparatus will deform when applying the pressure to the reaction core, making the apparatus unusable for future production runs. If the material does not have enough yield strength, then the apparatus will not return to its original shape following application of the pressure. Meanwhile, if the material is too brittle, the apparatus may crack upon application of the pressure to the reaction core. Thus, it is important that the material used to make the high pressure, high temperature apparatus have the necessary properties to withstand the pressures and temperatures over a large multitude of runs.

BRIEF SUMMARY OF THE INVENTION

Applicants have developed an apparatus for growing a synthetic diamond comprising a growth chamber, at least one manifold allowing access to the growth chamber, and a plurality of safety clamps positioned on opposite sides of the growth chamber; wherein the growth chamber and the plurality of safety clamps are comprised of a material having a tensile strength of about 120,000-200,000 psi, a yield strength of about 100,000-160,000 psi, an elongation of about 10-20%, an area reduction of about 40-50%, an impact strength of about 30-40 ft-lbs, and a hardness greater than 320 BHN.

Applicants have further developed a system for growing a plurality of synthetic diamonds comprising:
 a) a plurality of high pressure, high temperature apparatuses, each apparatus comprising a growth chamber, at least one manifold allowing access to the growth chamber, and a plurality of safety clamps positioned on opposite sides of the growth chamber;
 b) a central computer connected to each of the apparatuses for controlling the parameters in each of the apparatuses;
 c) a central cooling water source with associated conduits for supplying water to the growth chambers by way of the at least one manifold; and
 d) means for measuring current across at least one transformer located within each of said plurality of high pressure, high temperature apparatuses.

Furthermore, Applicants have developed a system for growing a plurality of synthetic diamonds comprising:
 a) a plurality of high pressure, high temperature apparatuses, each apparatus comprising a growth chamber, at least one manifold allowing access to the growth chamber, and a plurality of safety clamps positioned on opposite sides of the growth chamber;
 b) a central computer connected to each of the apparatuses for controlling the parameters in each of the apparatuses;
 c) a central cooling water source with associated conduits for supplying water to the growth chambers by way of the at least one manifold; and
 d) means for measuring current across at least one transformer located within each of the plurality of high pressure, high temperature apparatuses;
wherein the growth chamber and the plurality of safety clamps are comprised of a material having a tensile strength of about 120,000-200,000 psi, a yield strength of about 100,000-160,000 psi, an elongation of about 10-20%, an area reduction of about 40-50%, an impact strength of about 30-40 ft-lbs, and a hardness greater than 320 BHN.

Still further, Applicants have discovered a method for producing a synthetic diamond comprising:
 a) charging a diamond seed, a graphite source and a solvent/catalyst in a reaction core;
 b) placing the reaction core in a growth chamber of a high pressure, high temperature apparatus;
 c) subjecting the reaction core to elevated pressure and elevated temperature for a time sufficient to convert the graphite to the synthetic diamond;
wherein the apparatus comprises the growth chamber, at least one manifold allowing access to the growth chamber, and a plurality of safety clamps positioned on opposite sides of the growth chamber; and
wherein the growth chamber and the plurality of safety clamps are comprised of a material having a tensile strength of about 120,000-200,000 psi, a yield strength of about 100,000-160,000 psi, an elongation of about 10-20%, an area reduction of about 40-50%, an impact strength of about 30-40 ft-lbs, and a hardness greater than 320 BHN.

In addition, Applicants have developed a system for growing a plurality of synthetic diamonds comprising:
 a) a plurality of high pressure, high temperature apparatuses, each apparatus comprising an apparatus selected from the group consisting of a belt-type apparatus, a piston-cylinder apparatus, an annular-die apparatus and a toroid apparatus;
b) a central computer connected to each of said apparatuses for monitoring or controlling at least one parameter in each of said apparatuses;
c) a central water source with associated conduits for supplying water to said growth chambers by way of said at least one manifold; and
d) means for measuring current across at least one transformer located within each of said plurality of high pressure, high temperature apparatuses.

BRIEF DESCRIPTION OF THE DRAWINGS

Embodiments of the present inventive subject matter are described by way of example and with reference to the accompanying drawings wherein.

DETAILED DESCRIPTION OF THE EMBODIMENTS

Figure 1:
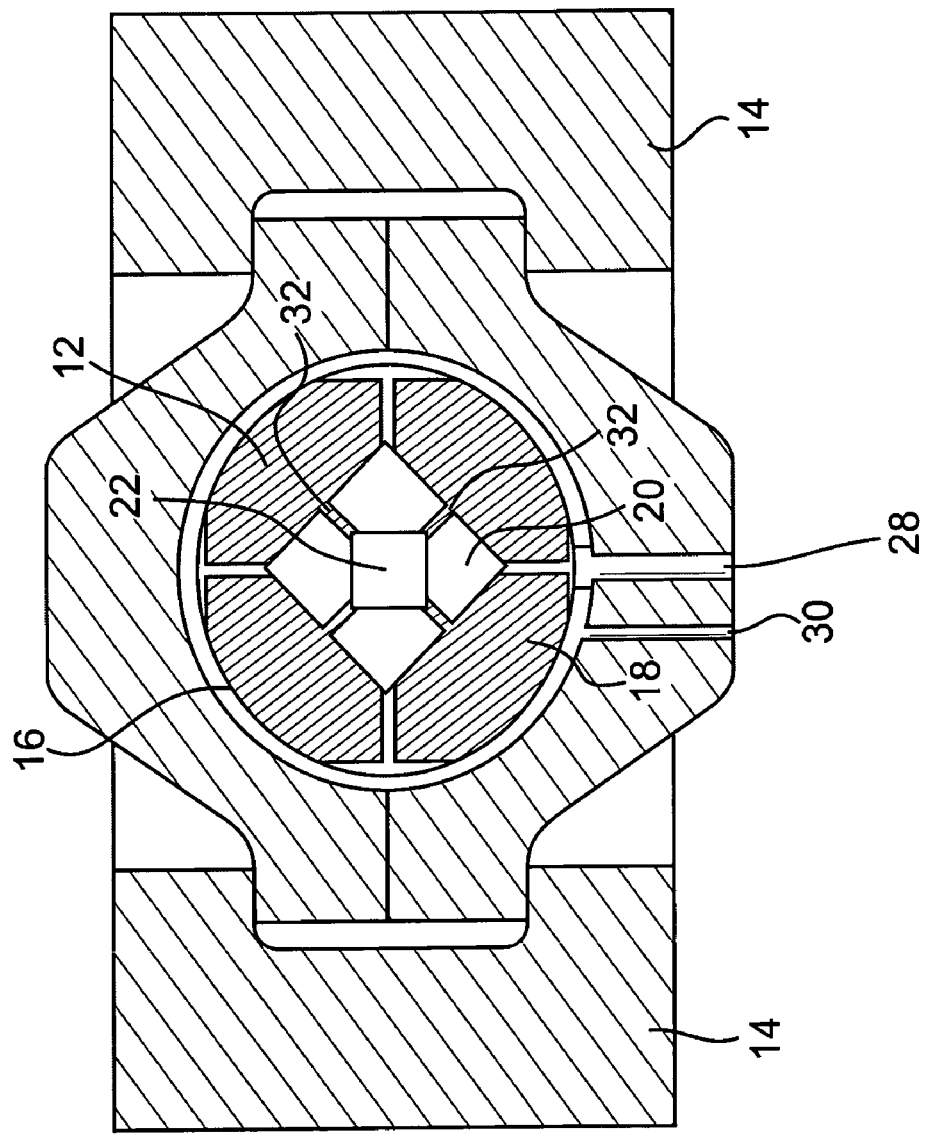
FIG. 1 is vertical cross-section view of an embodiment of the present inventive subject matter.

The present inventive subject matter is drawn to an apparatus for growing a synthetic diamond comprising a growth chamber, at least one manifold allowing access to the growth chamber, and a plurality of safety clamps positioned on opposite sides of the growth chamber. The growth chamber and the plurality of safety clamps are comprised of a material having a tensile strength of about 120,000-200,000 psi, a yield strength of about 100,000-160,000 psi, an elongation of about 10-20%, an area reduction of about 40-50%, an impact strength of about 30-40 ft-lbs, and a hardness greater than 320 BHN.

The apparatus of the present inventive subject matter is comprised of a material that has a particular tensile strength. "Tensile strength," as used herein, refers to the resistance of a material to a force tending to tear it apart, measured as the maximum tension the material can withstand without tearing. In other words, the tensile strength is a measurement of the force per unit area required to pull a material apart longitudinally.

The material used in the present inventive subject matter has a tensile strength of about 120,000-200,000 pounds per square inch (psi). In an aspect of the present inventive subject matter, the has a tensile strength greater than 150,000 psi. In a further aspect of the present inventive subject matter, the material has a tensile strength of at least 200,000 psi. The tensile strength of the present material may be measured by any accepted test.

The material in the present inventive subject matter also has a particular yield strength. As used herein, "yield strength" refers to the amount of applied stress needed to result in plastic deformation of a material. In other words, yield strength is a measurement of the amount of stress needed to deform a material enough so that the material does not return to its original shape upon removing the stress from the object. One skilled in the art will recognize those tests pertinent for evaluating the yield strength to the material used in the present inventive subject matter.

The material in the present inventive subject matter has a yield strength of 100,000-160,000 psi. In another aspect of the present inventive subject matter, the material used in making components of the apparatus has a yield strength of at least 140,000 psi. In a further aspect, the material has a yield strength of about 160,000 psi.

The material employed in the present inventive subject matter further has a defined elongation. As used herein, "elongation" refers to the percentage of change in length of a specimen prior to fracture upon application of stress to the material. In other words, elongation is a measure of the ductility of a material determined in a tension test. It is the increase in gage length (measured after rupture) divided by original gage length. Higher elongation indicates higher ductility for the material.

The material in the present inventive subject matter has an elongation of about 10-20%. In an aspect of the present inventive subject matter, the material used has an elongation greater than 12%. In a further aspect, the elongation of the material is about 12-15%. As can be seen, the relatively small elongation of the material indicates that the material is a generally hard material.

The material comprising the growth chamber and safety clamps of the present inventive subject matter also has a particularly defined area reduction. "Area reduction" or "reduction in area," as used interchangeably herein, refers to the contraction in cross-sectional area of a material at the fracture point upon application of enough stress to cause fracturing of the material. Upon failure of the material when stress above the tensile strength is applied, the cross section of the material specimen at the point of fracture is measured and compared with the original cross-section of the specimen. The area reduction is the percentage of reduction in the cross-sectional area of the specimen at the fracture point. A more elastic material will have a greater reduction in area due to the material being drawn out as the stress is applied prior to fracture. A more brittle, or more inelastic, material will have a smaller reduction in area since there will be less elongation of the more brittle material.

The material in the present inventive subject matter has an area reduction of about 40-50%. In a further aspect of the present inventive subject matter, the material has an area reduction of greater than about 45%.

The apparatus of the present inventive subject matter is also comprised of a material that has a specific impact strength. "Impact strength" is defined as the amount of energy consumed to break a test specimen divided by the unit-width of the specimen, when the specimen is broken by the stroke with the pendulum-type hammer having specific energy and linear velocity. Put another way, impact strength is the ability of a material to withstand shock loading. Impact strength is an indication of the toughness of a material.

The material used in the apparatus of the present inventive subject matter has an impact strength of about 30-40 foot pounds (ft-lbs). In a further aspect of the present inventive subject matter, the material has an impact strength greater than about 35 ft-lbs. In a still further aspect, the material has an impact strength of about 35-40 ft-lbs.

A further property present in the material used in the present inventive subject matter is a specific hardness. As used herein, "hardness" is defined as a measure of a material's resistance to localized plastic deformation, usually by indentation. However, the term may also refer to stiffness or temper, or to resistance to scratching, abrasion, or cutting. It is the property of a material, which gives it the ability to resist being permanently, deformed (bent, broken, or have its shape changed), when a load is applied. The greater the hardness of the material, the greater resistance it has to deformation.

One method to measure hardness is by using the Brinell harness test. Brinell hardness is determined by forcing a hard steel or carbide sphere of a specified diameter under a specified load into the surface of a material and measuring the diameter of the indentation left after the test. The Brinell hardness number, or simply the Brinell number or BHN, is obtained by dividing the load used, in kilograms, by the actual surface area of the indentation, in square millimeters. The result is a pressure measurement, but the units are rarely stated.

The material in the present inventive subject matter has a hardness, as measured by the Brinell hardness test, of about 300-350. In another aspect of the present inventive subject matter, the hardness of the material is about 320.

It is important that the material used in making the growth chamber and safety clamps of the present inventive subject matter has the above defined properties in order for the apparatus to maintain stability and reliability when being used to produce synthetic diamonds. The apparatus must be able to withstand the pressures and temperatures associated with making the synthetic diamond. If the material from which the apparatus is made is too soft, the apparatus will deform when applying the pressure to the reaction core, making the apparatus unusable for future production runs. If the material does not have enough yield strength, then the apparatus will not return to its original shape following application of the pressure. Meanwhile, if the material is too brittle, the apparatus may crack upon application of the pressure to the reaction core. Thus, it is important that the material used to make the high pressure, high temperature apparatus have the necessary properties to withstand the pressures and temperatures over a large multitude of runs. By using a material as defined above, the apparatus will perform as expected under the high pressure and temperature.

Suitable materials that possess the necessary properties as defined and claimed herein include, without limitation, tungsten carbide and various steel alloys. A particular material suitable for use in the present inventive apparatus comprises steel 4340. However, it is noted that any material possessing the properties discussed herein will be suitable for use in the production of synthetic diamonds.

Turning now to the figures, FIG. 1 is a vertical cross-sectional view of a high pressure, high temperature apparatus in accordance with an embodiment of the present inventive subject matter. High pressure, high temperature apparatus 10 is comprised of a split-sphere growth chamber 12 and a plurality of safety clamps 14 on opposite sides of growth chamber 12. Growth chamber 12 and safety clamps 14 are comprised of a material having the properties listed above for optimal performance.

Growth chamber 12 comprises an outer body having a top half and a bottom half, with a cavity 16 defined therein. Within cavity 16 are positioned large dies 18, small dies 20, and reaction core 22. In operation, as the top half and bottom half of growth chamber 12 are brought together, pressure is applied to large dies 18, which in turn apply pressure to small dies 20. As pressure is applied to small dies 20, the dies apply pressure to reaction core 22. Prior to being placed in growth chamber 12, reaction core 22 is charged with a graphite source, a diamond seed and a metal solvent/catalyst mixture used to produce a synthetic diamond. Graphite sources, diamond seeds and solvent/metal catalysts are generally known in the art, and any such material is appropriate for use in the apparatus of the present inventive subject matter.

High pressure, high temperature apparatus 10 also contains at least one manifold 28 which allows access to growth chamber 12 from outside apparatus 10. In the embodiment of FIG. 1, manifold 28 is a two-way manifold, allowing a user to either draw gases and other substances out of growth chamber 12 or introduce different gases or material into growth chamber 12. For example, if a user desires to remove as much impurities from growth chamber 12 as possible, a pump could be attached to apparatus 10 by way of manifold 28 and the pump could extract gaseous impurities from growth chamber 12. In an alternative matter, an inert gas or some other desired gas could be introduced into growth chamber 12 by way of manifold 28.

High pressure, high temperature apparatus 10 in FIG. 1 also includes a second manifold 30, through which oil is introduced into a cavity on the perimeter of growth chamber 12. The oil is present to ensure that pressure is applied evenly to each of large dies 18, which also results in pressure being applied evenly to the remaining components in growth chamber 12, including small dies 20 and reaction core 22. The oil introduced through manifold 30 is any such oil suitable for use as a pressure medium.

Manifold 28 in the embodiment depicted in FIG. 1 is also used to introduce water into growth chamber 12. Water is introduced into growth chamber 12 in order to cool and maintain the temperature of large dies 18 and small dies 20. Water is circulated around large dies 18 and small dies 20, however, gaskets 32 positioned between adjacent small dies 20 seal reaction core 22 so that water does not reach reaction core 22.

Reaction core 22 is heated by resistance heating by way of a current that also runs through large dies 18 and small dies 20. Gaskets 32 act as insulators by keeping small dies 20 from touching each other, which would result in shorting out the electrical system. Gaskets 32 further help to equilibrate the pressure being applied to reaction core 22 from small dies 20. Suitable gasket materials are known in the art of high pressure, high temperature apparatuses, and any such material can be used in the present inventive subject matter.

The embodiment of the high pressure, high temperature apparatus depicted in FIG. 1 may also include at least one transformer (not shown) which aids in the resistance heating of reaction core 22. The transformer is used to change the voltage of the current being supplied from the primary power source (also not shown) to reaction core 22. In an aspect of the present inventive subject matter, high pressure, high temperature apparatus 10 includes means for measuring the current across the at least one transformer present in apparatus 10. In prior art apparatuses, the amount of power or current supplied to the reaction core is measured at the primary power supply based on the desired temperature of the reaction core and the other resistors and circuitry present in the apparatus. Changes in the current or power supplied to the apparatus are not monitored other than noting that which is initially supplied to the apparatus. In the present inventive subject matter, however, means for measuring the current across the at least one transformer allow a user to monitor actual current that is being supplied to the apparatus. By measuring the current across a transformer present in the apparatus, the circuit is simplified since additional resistors are not needed to ensure that the proper current is supplied to the reaction core. In addition, measuring the current across a transformer allows for much better control of the temperature of the reaction core since minor fluctuations in current, which result in fluctuations in the temperature of the reaction core, are more easily detected and corrected by measuring the actual current present in the apparatus.

The embodiment of the present inventive subject matter depicted in FIG. 1 includes eight large dies 18 surrounding six small dies 20. The large dies and the small dies are independently constructed of materials having properties comparable to the material from which the growth chamber and the safety clamps are made. Materials suitable for making the large dies include processed steel and tungsten carbide. In one aspect of this embodiment, the large dies are made from steel 4340. Likewise, materials suitable for making the small dies also include processed steel and tungsten carbide. In another aspect of this embodiment, the small dies are made from tungsten carbide.

The amount of pressure and temperature required to produce a synthetic diamond in a high pressure, high temperature apparatus is about 700,000-900,000 psi and about 1300-1800° C., respectively. Thus, it is important that the materials used in making the apparatus, as well as the large and small dies, be selected in order to withstand these extreme conditions. However, to reliably produce a synthetic diamond, it is also necessary to maintain a consistent control over the various parameters present in the high pressure, high temperature apparatus. These parameters can include: the pressure applied to the reaction core, the temperature of the reaction core, the rate of the cooling water, the temperature of the cooling water, and the amount of current across a transformer in the apparatus. It is difficult, though, to maintain consistency of the parameters when a plurality of high pressure, high temperature apparatuses are being employed to produce synthetic diamonds. In other words, it is difficult to ensure that the parameters of one apparatus are consistent with the parameters of another apparatus. For example, if the current to across a transformer in a first apparatus is slightly less than the current across a transformer in a second apparatus, the temperatures in the two apparatuses may be different, resulting in variations in the synthetic diamonds that are produced in the respective apparatuses. Therefore, Applicants have developed a novel system for growing a plurality of synthetic diamonds by simultaneously using a plurality of apparatuses and monitoring or controlling the apparatuses using a central computer.

Figure 2:
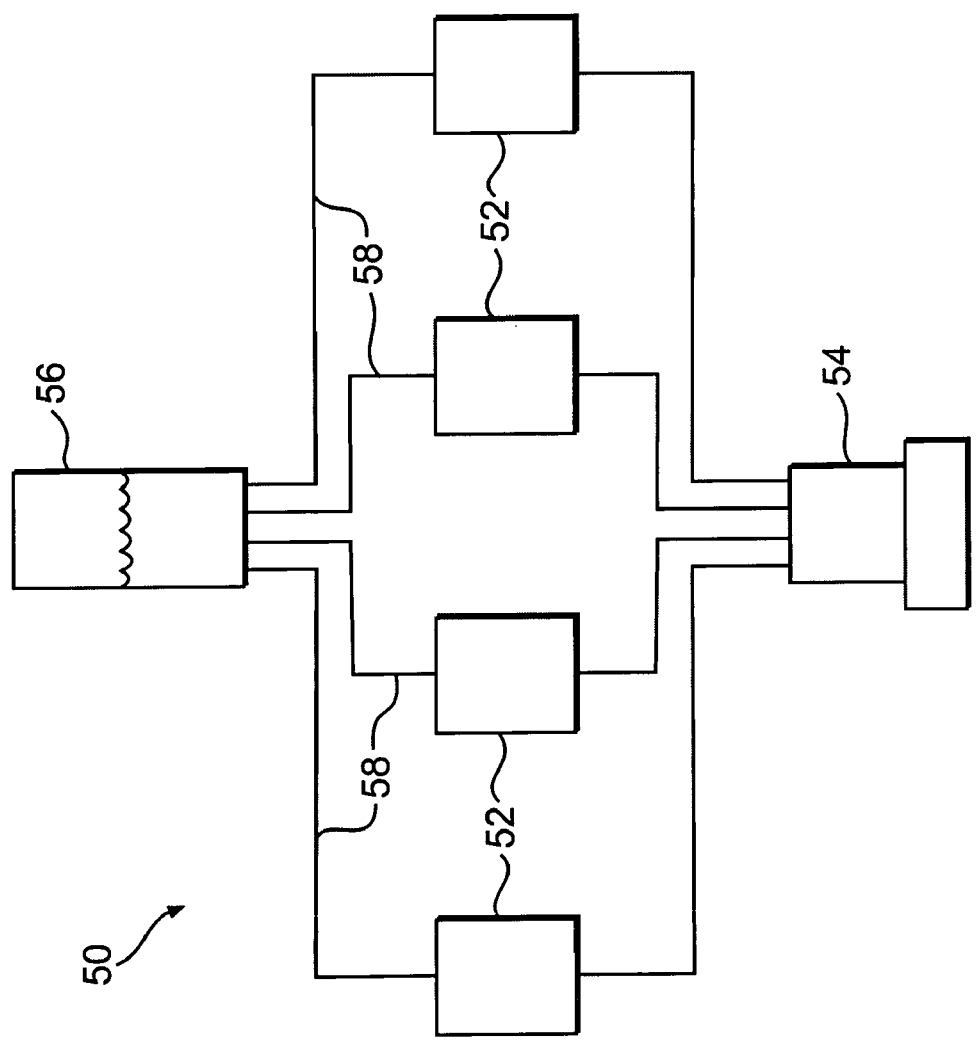
FIG. 2 is a schematic of an embodiment of the present inventive subject matter.

Turning now to FIG. 2, a system 50 for growing a plurality of synthetic diamonds is depicted. System 50 includes a plurality of high temperature, high pressure apparatuses 52 for growing synthetic diamonds. Each apparatus 52 contains the components described above with respect to FIG. 1. In particular, each apparatus 52 includes a growth chamber, at least one manifold allowing access to the growth chamber, and a plurality of safety clamps positioned on opposite sides of the growth chamber. The growth chamber in each apparatus further comprises an outer body having a cavity formed therein, a reaction core and a plurality of dies positioned to apply pressure to the reaction core. The reaction core and the plurality of dies located within the cavity. The plurality of dies further includes a plurality of small dies adjacent to the reaction core and a plurality of large dies surrounding the plurality of small dies.

System 50 also includes a central computer 54. Each apparatus 52 is connected to central computer 54 and monitored or controlled thereby. Central computer 54 contains a program which monitors variables and parameters in each apparatus 52. Among the parameters monitored by central computer 54 are those parameters in each apparatus 52 described above with respect to the reliable production of synthetic diamonds. In particular, central computer 54 monitors and controls at least the following parameters in each apparatus 52: the pressure applied to the reaction core, the temperature of the reaction core, the rate of the cooling water, the temperature of the cooling water, and the amount of current across a transformer in the apparatus and combinations of the parameters. Other parameters and variables within each apparatus 52 may also be monitored and controlled by central computer 54.

Central computer 54 is in communication with at least one apparatus 52. In the embodiment depicted in FIG. 2, central computer is in communication with four apparatuses 52. However, it is contemplated that central computer 54 is able to control from one to about twenty apparatuses at one time. In an aspect of the present inventive subject matter, system 50 comprises about 2-16 high pressure, high temperature apparatuses. In a further aspect of the present inventive subject matter, system 50 comprises about 10 apparatuses, with central computer 54 controlling the parameters in each apparatus.

Central computer 54 controls or monitors the parameters in multiple high pressure, high temperature apparatuses, thus bringing consistency and reliability to the growth of synthetic diamonds in those apparatuses. As is indicated above, variations in the different parameters of the high pressure, high temperature apparatuses lead to variations in the size, color and overall quality of the synthetic diamonds produced in the apparatuses. By monitoring and controlling the various parameters using the central computer, consistency of the parameters between different machines is achieved, resulting in a consistently higher quality product being produced.

In addition, the use of the central computer allows a user to quickly and conveniently monitor the conditions in any given apparatus. The central computer also permits storage of the production variables for easy access and comparison. If a particular synthetic diamond does not turn out as was expected, the central computer will have a record of the conditions in the apparatus for a simple analysis to determine the cause of the problem.

System 50 depicted in FIG. 2 also contains a central water source 56 which supplies water to each of high pressure, high temperature apparatuses 52. Central water source 56 supplies water to each apparatus 52 by way of associated conduits 58. Central water source 56 is able to control the temperature of the water being supplied to each apparatus 52 through conduits 58. The temperature of the water can be either raised or lowered by central water source 56. By using central water source 56 for supplying each apparatus 52 with water, the water supplied to each apparatus will be the same temperature. The consistent water temperature, in conjunction with monitoring and maintaining consistency among the other parameters of the apparatuses, helps maximize the growth consistency of the synthetic diamonds within the system. If the water applied to one high pressure, high temperature apparatus is higher in temperature than the water applied to a second apparatus, the growth rate and quality of synthetic diamonds may be different as produced by the two apparatuses. By using a central water source, Applicants can ensure that the same temperature water is applied to each apparatus, thus helping maintain consistency between the various apparatuses.

In a particular aspect of this embodiment of the present inventive subject matter, each apparatus 52 is comprised of the material described above. In particular, the growth chamber and safety clamps of each apparatus 52 is comprised of a material of a material having a tensile strength of about 120,000-200,000 psi, a yield strength of about 100,000-160,000 psi, an elongation of about 10-20%, an area reduction of about 40-50%, an impact strength of about 30-40 ft-lbs, and a hardness greater than 320 BHN. More particularly, the material has a tensile strength greater than 150,000 psi, a yield strength greater than 140,000 psi, an elongation greater than 12%, an area reduction greater than 45%, a impact strength greater than 35 ft.-lbs and a hardness greater than 320. Even more particularly, the material is an alloyed steel, including steel 4340.

The present inventive subject matter is also drawn to a method of producing a synthetic diamond using the high pressure, high temperature apparatus and system as described herein. In particular, the method for producing a synthetic diamond comprises the steps of charging a diamond seed, a graphite source and a solvent/catalyst in a reaction core, placing the reaction core in a growth chamber of a high pressure, high temperature apparatus as described herein and subjecting the reaction core to elevated pressure and elevated temperature for a time sufficient to convert the graphite to the synthetic diamond.

The apparatus of this embodiment comprises the growth chamber, at least one manifold allowing access to the growth chamber, and a plurality of safety clamps positioned on opposite sides of the growth chamber. Furthermore, the growth chamber and the plurality of safety clamps are comprised of a material having a tensile strength of about 120,000-200,000 psi, a yield strength of about 100,000-160,000 psi, an elongation of about 10-20%, an area reduction of about 40-50%, an impact strength of about 30-40 ft-lbs, and a hardness greater than 320 BHN.

In another aspect of the present embodiment, the material comprising the growth chamber and safety clamps of the apparatus have the properties further defined herein, namely a tensile strength greater than 150,000 psi, a yield strength greater than 140,000 psi, an elongation greater than 12%, an area reduction greater than 45%, a impact strength greater than 35 ft.-lbs and a hardness greater than 320. In a further aspect, the material is comprised of allowed steel, particularly 4340 steel.

The growth chamber in this embodiment comprises an outer body having a cavity formed therein, a reaction core and a plurality of dies positioned to apply pressure to the reaction core. The reaction core and the plurality of dies are located within the cavity. Furthermore, the plurality of dies comprises a plurality of small dies adjacent to the reaction core and a plurality of large dies surrounding the plurality of small dies.

The method of this embodiment of the present inventive subject matter further comprising the step of monitoring or controlling at least one parameter within the apparatus by using a central computer. The parameter monitored or controlled by the central computer is selected from the group consisting of pressure applied to the reaction core, temperature of the reaction core, rate of the cooling water, temperature of the cooling water, and the amount of current across the transformer. It is contemplated within the scope of this embodiment that the central computer monitors or controls all of the listed parameters in the apparatus.

In a further embodiment, the present inventive subject matter is also directed to a method for producing a plurality of synthetic diamonds. The method of this embodiment involves operating a system for growing the plurality of synthetic diamonds. In this method, a plurality of reaction cores are each charged with a diamond seed, a graphite source and metal solvent/catalysts necessary to propagate the growth of the synthetic diamond. The plurality of reaction cores are then placed in growth chambers of high pressure, high temperature apparatuses, one reaction core per growth chamber. The reaction cores are then subjected to elevated pressure and elevated temperature for a time sufficient to convert the graphite to the synthetic diamond.

The method of this embodiment also includes the steps of monitoring or controlling at least one parameter in each of the apparatuses by using a computer to conduct such monitoring or controlling, supplying water from a central water source to each of the growth chambers by way of at least one manifold located in each apparatus, and measuring current across at least one transformer located within each of the plurality of high pressure, high temperature apparatuses.

The central computer in this embodiment monitors or controls the parameters of at least one high pressure, high temperature apparatus. In an alternative aspect of this embodiment, the central computer monitors or controls about 2-16 apparatuses at one time. In a further alternative aspect, the central computer controls about 10 apparatuses.

The central computer controls or monitors at least one parameter in the apparatuses. The parameter may be selected from the group consisting of pressure applied to the reaction core, temperature of the reaction core, rate of the cooling water, temperature of the cooling water, and the amount of current across the transformer. Another aspect of this embodiment is directed to the central computer controlling more than one, and possibly all, of the parameters of the apparatuses.

One of skill in the art of high pressure, high temperature apparatuses will appreciate that the embodiments described above are in relation to a split-sphere high pressure, high temperature apparatus. However, the methods described above is for illustrative purposes and should not be construed as limiting the inventive subject matter to use only in split-sphere high pressure, high temperature apparatuses.

Other high pressure, high temperature apparatuses are also usable in the methods of the present inventive subject matter. Examples of other high pressure, high temperature apparatuses include, without limitation, a belt-type apparatus, a piston-cylinder apparatus, an annular-die apparatus and a toroid apparatus. Each type of high pressure, high temperature apparatus is well-known in the art. For example, U.S. Pat. No. 4,301,134 to Strong describes a belt-type high pressure, high temperature apparatus usable in the present inventive subject matter, while U.S. Pat. No. 5,244,368 to Frushour describes a non-limiting example of a piston-cylinder high pressure, high temperature apparatus that is also usable in the present inventive subject matter. Likewise, U.S. Pat. No. 4,518,334 describes an annular-die high pressure, high temperature apparatus employable in the present inventive subject matter. Further, U.S. Pat. No. 4,290,741 to Kolchin et al. and U.S. Patent Application Publication No. 2004/0134415 to D'Evelyn et al. disclose toroid high pressure, high temperature apparatuses that are usable in the present inventive subject matter. The contents of each of the above-listed U.S. patents and published patent applications are hereby incorporated in their entirety.

The inventive subject matter also contemplates using material with the desired characteristics as described above in the alternative high pressure, high temperature appparatuses. In other words, the other types of high pressure, high temperature apparatuses may also be made from a material having a tensile strength of about 120,000-200,000 psi, a yield strength of about 100,000-160,000 psi, an elongation of about 10-20%, an area reduction of about 40-50%, an impact strength of about 30-40 ft-lbs, and a hardness greater than 320 BHN.

The inventive subject matter being thus described, it will be obvious that the same may be varied in many ways. Such variations are not to be regarded as a departure from the spirit and scope of the inventive subject matter, and all such modifications are intended to be included within the scope of the following claims.

The invention claimed is:

1. An apparatus for growing a synthetic diamond comprising a split-sphere apparatus including:
   a growth chamber comprising an outer body having a cavity formed therein, a reaction core and a plurality of dies positioned to apply pressure to said reaction core, said reaction core and said plurality of dies located within said cavity;

at least one manifold allowing access to said growth chamber; and a plurality of safety clamps positioned on opposite sides of said growth chamber;

wherein said growth chamber and said plurality of safety clamps are comprised of a material having a tensile strength of about 120,000-200,000 psi, a yield strength of about 100,000-160,000 psi, an elongation of about 10-20%, an area reduction of about 40-50%, an impact strength of about 30-40 ft-lbs, and a hardness greater than 320 BHN.

2. The apparatus according to claim 1 wherein said plurality of dies comprises a plurality of small dies adjacent to said reaction core and a plurality of large dies surrounding said plurality of small dies.

3. The apparatus according to claim 1 further comprising means for supplying water to said growth chamber.

4. The apparatus according to claim 1 wherein said material comprises alloyed steel.

5. The apparatus according to claim 1 wherein said material has a tensile strength greater than 150,000 psi.

6. The apparatus according to claim 1 wherein said material has a yield strength greater than 140,000 psi.

7. The apparatus according to claim 1 wherein said material has an elongation greater than 12%.

8. The apparatus according to claim 1 wherein said material has an area reduction greater than 45%, a impact strength greater than 35 ft.-lbs and a hardness greater than 320.

9. A system for growing a plurality of synthetic diamonds comprising:
a) a plurality of high pressure, high temperature apparatuses, each apparatus comprising a split-sphere apparatus including:
a growth chamber comprising an outer body having a cavity formed therein, a reaction core and a plurality of dies positioned to apply pressure to said reaction core, said reaction core and said plurality of dies located within said cavity, at least one manifold allowing access to said growth chamber, and a plurality of safety clamps positioned on opposite sides of said growth chamber;
b) a central computer connected to each of said apparatuses for monitoring or controlling at least one parameter in each of said apparatuses;
c) a central water source with associated conduits for supplying water to said growth chambers by way of said at least one manifold; and
d) means for measuring current across at least one transformer located within each of said plurality of high pressure, high temperature apparatuses;
wherein said growth chamber and said plurality of safety clamps are comprised of a material having a tensile strength of about 120,000-200,000 psi, a yield strength of about 100,000-160,000 psi, an elongation of about 10-20%, an area reduction of about 40-50%, an impact strength of about 30-40 ft-lbs, and a hardness greater than 320 BHN.

10. The system according to claim 9 wherein said system comprises about 2-16 apparatuses, each of said apparatuses connected to said central computer.

11. The system according to claim 10 wherein said system comprises about 10 apparatuses, each of said apparatuses connected to said central computer.

12. The system according to claim 9 wherein said at least one parameter is selected from the group consisting of pressure applied to the reaction core, temperature of the reaction core, feed rate of the cooling water, temperature of the cooling water, the amount of current across the transformer and combinations thereof.

13. The system according to claim 9 wherein said plurality of dies comprises a plurality of small dies adjacent to said reaction core and a plurality of large dies surrounding said plurality of small dies.

14. The system according to claim 9 wherein said material comprises alloyed steel.

15. A system for growing a plurality of synthetic diamonds comprising:
a) a plurality of high pressure, high temperature apparatuses, each apparatus comprising a split-sphere apparatus including:
a growth chamber comprising an outer body having a cavity formed therein, a reaction core and a plurality of dies positioned to apply pressure to said reaction core, said reaction core and said plurality of dies located within said cavity, at least one manifold allowing access to said growth chamber, and a plurality of safety clamps positioned on opposite sides of said growth chamber;
b) a central computer connected to each of said apparatuses for monitoring or controlling at least one parameter in each of said apparatuses;
c) a central water source with associated conduits for supplying water to said growth chambers by way of said at least one manifold; and
d) means for measuring current across at least one transformer located within each of said plurality of high pressure, high temperature apparatuses.

16. The system according to claim 15 wherein said growth chamber and said plurality of safety clamps are comprised of a material having a tensile strength of about 120,000-200,000 psi, a yield strength of about 100,000-160,000 psi, an elongation of about 10-20%, an area reduction of about 40-50%, an impact strength of about 30-40 ft-lbs, and a hardness greater than 320 BHN.

17. The system according to claim 15 wherein said system comprises about 2-16 apparatuses, each of said apparatuses connected to said central computer.

18. The system according to claim 15 wherein said system comprises about 10 apparatuses, each of said apparatuses connected to said central computer.

19. The system according to claim 15 wherein said at least one parameter is selected from the group consisting of pressure applied to the reaction core, temperature of the reaction core, rate of the cooling water, temperature of the cooling water, and the amount of current across the transformer and combinations thereof.

20. The system according to claim 15 wherein said plurality of dies comprises a plurality of small dies adjacent to said reaction core and a plurality of large dies surrounding said plurality of small dies.

21. The system according to claim 15 wherein said material comprises alloyed steel.

* * * * *